(12) United States Patent
Fujiwara et al.

(10) Patent No.: US 11,178,321 B2
(45) Date of Patent: Nov. 16, 2021

(54) OPTICAL APPARATUS

(71) Applicant: CANON KABUSHIKI KAISHA, Tokyo (JP)

(72) Inventors: Daisuke Fujiwara, Tokyo (JP); Tomoya Onaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/843,258

(22) Filed: Apr. 8, 2020

(65) Prior Publication Data

US 2020/0329180 A1 Oct. 15, 2020

(30) Foreign Application Priority Data

Apr. 10, 2019 (JP) .............................. JP2019-074542
May 13, 2019 (JP) .............................. JP2019-090883

(Continued)

(51) Int. Cl.
*H04N 5/225* (2006.01)
*G02B 7/02* (2021.01)
(Continued)

(52) U.S. Cl.
CPC ............ *H04N 5/2254* (2013.01); *G02B 7/02* (2013.01); *G02B 7/021* (2013.01); *G02B 7/08* (2013.01);
(Continued)

(58) Field of Classification Search
CPC .. H04N 5/2254; H04N 5/2252; H04N 5/2253; G02B 7/02; G02B 7/021;
(Continued)

(56) References Cited

U.S. PATENT DOCUMENTS

| | | | | |
|---|---|---|---|---|
| 4,090,069 A | * | 5/1978 | Lisfeld | G02B 21/242 250/231.14 |
| 4,827,348 A | * | 5/1989 | Ernest | H04N 5/2254 348/221.1 |

(Continued)

FOREIGN PATENT DOCUMENTS

| | | |
|---|---|---|
| CN | 1964436 A | 5/2007 |
| CN | 101236280 A | 8/2008 |

(Continued)

OTHER PUBLICATIONS

Extended European Search Report issued by the European Patent Office dated Aug. 27, 2020 in corresponding EP Application No. 20168643.3.

(Continued)

*Primary Examiner* — Timothy J Henn
(74) *Attorney, Agent, or Firm* — Carter, DeLuca & Farrell LLP

(57) ABSTRACT

An optical apparatus includes a holding frame configured to hold an optical element and including a rack, and a driver configured to drive the holding frame. The driver includes a worm rotated by the actuator, a worm wheel configured to form a worm gear together with the worm, and a pinion configured to rotate with a rotation of the worm wheel and engaged with the rack.

8 Claims, 4 Drawing Sheets

(30) Foreign Application Priority Data

May 27, 2019 (JP) .............................. JP2019-098375
Sep. 9, 2019 (JP) .............................. JP2019-163542

(51) Int. Cl.
*G02B 7/08* (2021.01)
*G03B 17/12* (2021.01)
*G02B 5/20* (2006.01)

(52) U.S. Cl.
CPC ........... *G03B 17/12* (2013.01); *H04N 5/2252* (2013.01); *H04N 5/2253* (2013.01); *G02B 5/20* (2013.01); *G03B 2205/0053* (2013.01)

(58) Field of Classification Search
CPC . G02B 7/08; G02B 5/20; G02B 7/006; G03B 17/12; G03B 2205/0053; G03B 17/02; G03B 11/00
See application file for complete search history.

(56) References Cited

U.S. PATENT DOCUMENTS

| | | | | |
|---|---|---|---|---|
| 6,137,958 | A * | 10/2000 | Toyoda | G02B 27/281 396/166 |
| 2006/0077284 | A1 * | 4/2006 | Kurosawa | H04N 5/2354 348/371 |
| 2006/0268232 | A1 * | 11/2006 | Jin | G03B 21/145 352/204 |
| 2008/0106805 | A1 * | 5/2008 | Aiba | G02B 26/007 359/723 |
| 2008/0143868 | A1 | 6/2008 | Tsuchiya et al. | |
| 2010/0111516 | A1 * | 5/2010 | Basho | G03B 27/58 396/427 |
| 2010/0172036 | A1 | 7/2010 | Oian | |
| 2011/0090578 | A1 * | 4/2011 | Yoshimura | G03B 5/04 359/811 |
| 2012/0257097 | A1 | 10/2012 | Takai | |
| 2012/0320202 | A1 * | 12/2012 | Qian | G02B 26/007 348/143 |
| 2013/0148222 | A1 * | 6/2013 | Wang | G02B 7/006 359/892 |
| 2015/0002730 | A1 | 1/2015 | Shi et al. | |
| 2015/0042818 | A1 * | 2/2015 | Wada | H04N 5/2254 348/164 |
| 2015/0070563 | A1 | 3/2015 | Sperber | |
| 2016/0006958 | A1 | 1/2016 | Iwamatsu | |
| 2018/0172943 | A1 | 6/2018 | Lee | |
| 2019/0076007 | A1 * | 3/2019 | Higashiyama | A61B 1/04 |
| 2019/0187404 | A1 | 6/2019 | Onaka | |
| 2020/0029780 | A1 * | 1/2020 | Woo | A47L 15/4234 |
| 2020/0077027 | A1 | 3/2020 | Onaka | |
| 2020/0329180 | A1 | 10/2020 | Fujiwara et al. | |

FOREIGN PATENT DOCUMENTS

| | | |
|---|---|---|
| CN | 101246300 A | 8/2008 |
| CN | 101986182 A | 3/2011 |
| CN | 102012610 A | 4/2011 |
| CN | 102405439 A | 4/2012 |
| CN | 102577351 A | 7/2012 |
| CN | 102636938 A | 8/2012 |
| CN | 202631926 U | 12/2012 |
| CN | 103268050 A | 8/2013 |
| CN | 203405615 U | 1/2014 |
| CN | 203502715 U | 3/2014 |
| CN | 203535359 U | 4/2014 |
| CN | 105301871 A | 2/2016 |
| CN | 108241245 A | 7/2018 |
| CN | 208479813 U | 2/2019 |
| CN | 109425949 A | 3/2019 |
| EP | 3722872 A1 | 10/2020 |
| JP | H04163429 A | 6/1992 |
| JP | 2002330320 A | 11/2002 |
| JP | 2006074654 A | 3/2006 |
| JP | 2006258969 A | 9/2006 |
| JP | 2012173523 A | 9/2012 |
| JP | 2016015617 A | 1/2016 |
| JP | 2016122074 A | 7/2016 |
| JP | 2018074224 A | 5/2018 |
| TW | 200827900 A | 7/2008 |
| WO | 3026700 A1 | 5/2000 |

OTHER PUBLICATIONS

Extended European Search Report issued by the European Patent Office dated Aug. 13, 2020 in corresponding EP Application No. 20168642.5.
Extended European Search Report issued by the European Patent Office dated Aug. 7, 2020 in corresponding EP Application No. 20168641.7.
Japanese Office Action dated Nov. 24, 2020, for Corresponding Japanese Application No. 2019-163542.
Office Action dated Apr. 27, 2021 by the U.S. Patent and Trademark Office in corresponding U.S. Appl. No. 16/843,283.
Notification of First Office Action issued by the China National Intellectual Property Administration dated Aug. 26, 2021 in corresponding CN Patent Application No. 202010267507.9, with English translation.
Notification of the First Office Action issued by the China National Intellectual Property Administration dated Sep. 3, 2021 in corresponding CN Patent Application No. 202010267468.2, with English translation.
Notification of the First Office Action issued by the China National Intellectual Property Administration dated Aug. 31, 2021 in corresponding CN Patent Application No. 202010267465.9, with English translation.

* cited by examiner

OPTICAL APPARATUS

BACKGROUND OF THE INVENTION

Field of the Invention

The present invention relates to an optical apparatus having a mechanism for driving an optical element, such as an optical filter.

Description of the Related Art

Conventionally, there has been known an image pickup apparatus equipped with a filter switching mechanism for inserting and removing an infrared blocking filter (infrared cutting filter), an ND filter, and the like into and from an optical path. For example, Japanese Patent Laid-Open No. ("JP") 2012-173523 discloses a filter switching mechanism for inserting and removing a filter frame that holds a filter into and from an optical path by an actuator having a lever.

However, the filter switching mechanism disclosed in JP 2012-173523 has a weak holding force for holding (locking) the filter frame at a predetermined position, and the filter may be unintentionally switched when the vibration or impact is applied. On the other hand, if the torque of the actuator is made larger to increase the holding force, the actuator and finally the image pickup apparatus become larger. Any dedicated lock unit for locking the filter frame at the predetermined position will also increase the size of the image pickup apparatus.

SUMMARY OF THE INVENTION

The present invention provides a compact optical apparatus that can move and stably hold (or lock) an optical element.

An optical apparatus according to one aspect of the present invention includes a holding frame configured to hold an optical element and including a rack, and a driver configured to drive the holding frame. The driver includes a worm rotated by the actuator, a worm wheel configured to form a worm gear together with the worm, and a pinion configured to rotate with a rotation of the worm wheel and engaged with the rack.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
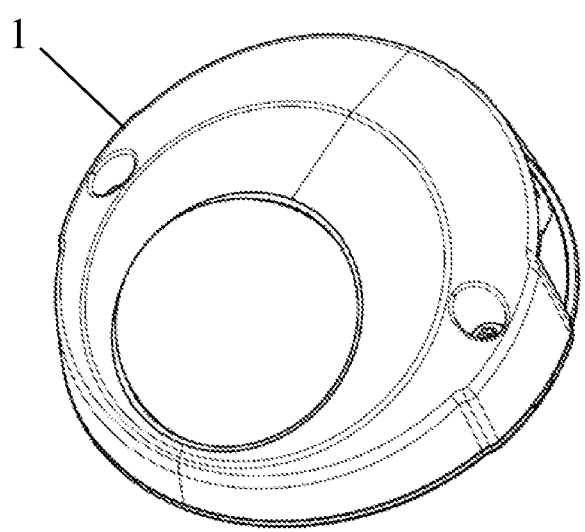
FIG. 1 is a perspective view of an image pickup apparatus according to one embodiment of the present invention.
Figure 2A:
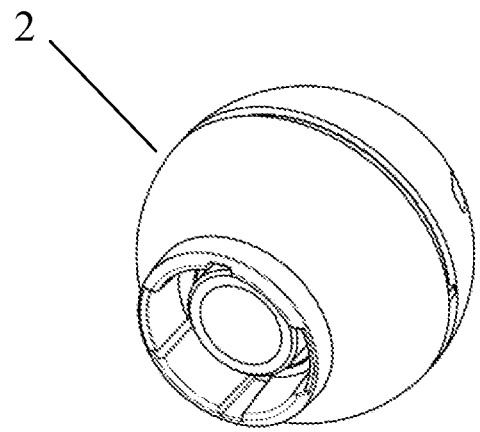
FIGS. 2A and 2B are perspective and sectional views of a camera unit according to this embodiment.
Figure 2B:
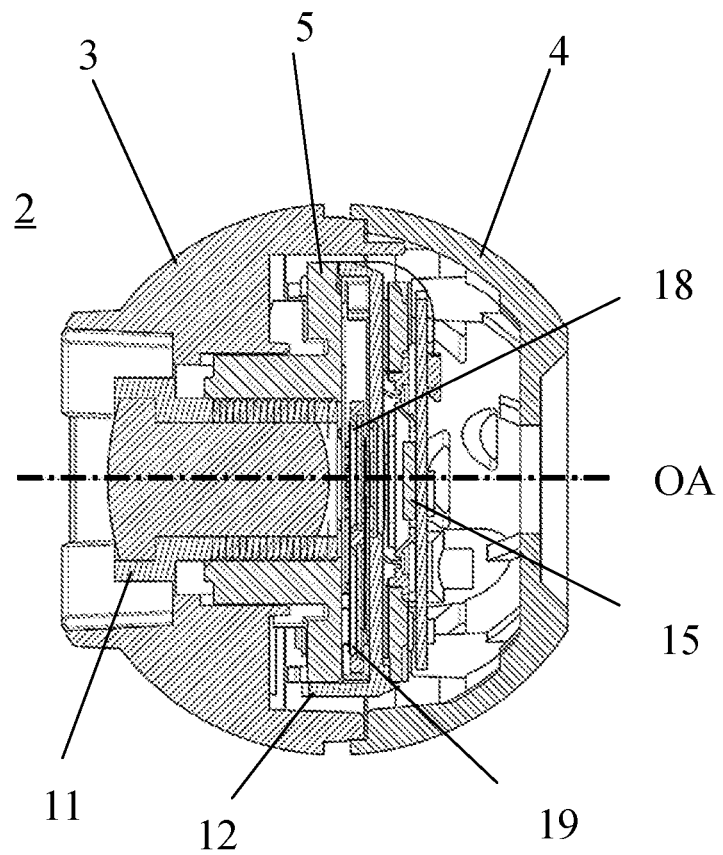
Figure 3:
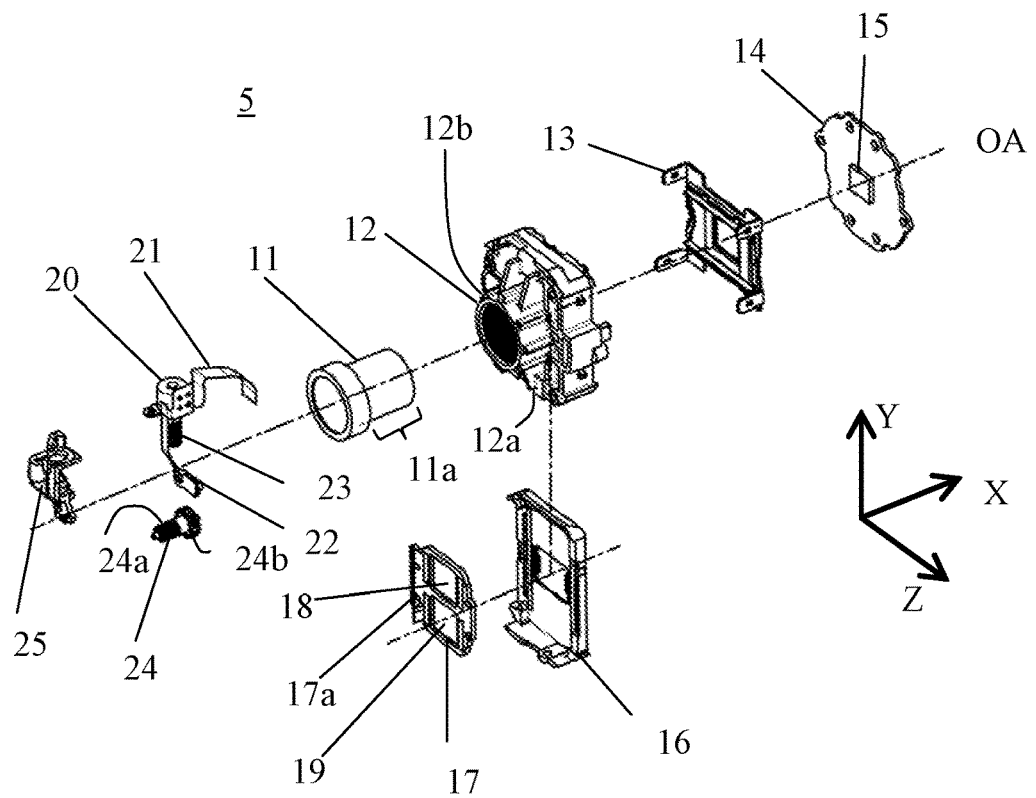
FIG. 3 is an exploded perspective view of a lens barrel unit according to this embodiment.

FIG. 1 is a perspective view of an image pickup apparatus 1 as a surveillance camera apparatus according to one embodiment of the present invention. The image pickup apparatus (optical apparatus) 1 includes a camera unit (optical apparatus) 2. FIG. 2A is a perspective view of the camera unit 2, and FIG. 2B is a sectional view along an optical axis OA of the camera unit 2 illustrated in FIG. 2A. The left side (object side) in FIG. 2B is called a front side, and the right side is called a rear side. The camera unit 2 has a front holder 3 and a rear holder 4 and has an approximately spherical shape. The camera unit 2 has a lens barrel unit (lens or optical apparatus) 5. The lens barrel unit 5 is sandwiched and fixed between the front holder 3 and the rear holder 4. FIG. 3 is an exploded perspective view of the lens barrel unit 5.

The lens barrel unit 5 includes a lens unit 11, a fixed barrel 12, dustproof rubber 13, an image sensor substrate 14, a filter base 16, a filter holding frame 17, an actuator 20, and a gear cover 25, as illustrated in FIG. 3.

The lens unit 11 holds an image pickup optical system that forms an optical image of an object and includes one or more lenses. One or more lenses may be movable in the optical axis direction (X-axis direction) or unmovable (fixed). The lens may include a focus lens for focusing and a zoom lens (magnification varying lens) for changing a focal length. As illustrated in FIG. 2A, the lens unit 11 has a threaded groove formed on a surface of an attachment portion 11a, and a threaded groove is also formed on an inner surface of an attachment portion 12b of the fixed lens barrel 12. The lens unit 11 is fixed into the fixed lens barrel 12 through an engagement between the mounting portions 11a and 12b (by screwing the attachment portion 11a into the attachment portion 12b).

The dustproof rubber 13 is engaged with the fixed lens barrel 12 to provide the dustproof and antivibration. The image sensor substrate 14 is a substrate mounted with an image sensor 15, is fixed onto the fixed lens barrel 12, and the dustproof rubber 13 is sandwiched between the fixed lens barrel 12 and the image sensor substrate 14. The image sensor 15 photoelectrically converts an optical image formed via the image pickup optical system, and includes a photoelectric conversion element, such as a CCD and a CMOS.

The filter holding frame 17 has a rack 17a on a side surface orthogonal to the Z-axis direction, and holds an infrared cutting filter (optical element) 18 for blocking infrared rays and a dummy glass 19. The filter holding frame 17 is held by the filter base 16 movably in a direction orthogonal to the optical axis of the lens unit 11 (Y-axis direction), and the filter base 16 is inserted into the Y-axis direction from an opening 12a provided on a side surface of the fixed lens barrel 12 and held by the fixed lens barrel 12.

Figure 4:
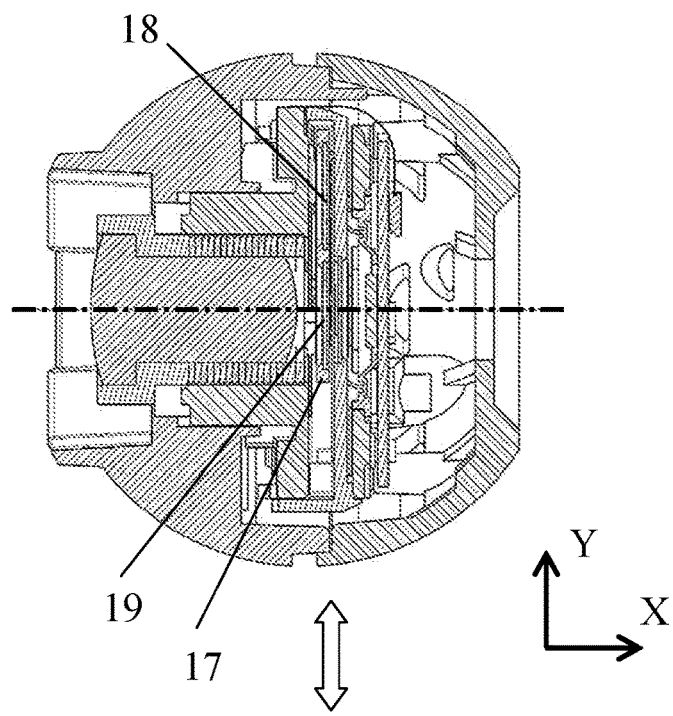
FIG. 4 is a sectional view of the camera unit according to this embodiment, showing a dummy glass inserted into an optical path.

The filter holding frame 17 is driven by a driver. More specifically, the driver drives the filter holding frame 17 so that the infrared cutting filter 18 moves between a position on the optical axis of the image pickup optical system and a position retracted from the optical axis OA. In FIG. 2B, the infrared cutting filter 18 is located on the optical axis. In FIG. 4, the dummy glass 19 is located on the optical axis. The configuration of the driver will be described later.

The actuator 20, such as a motor, serving as a driving source drives the filter holding frame 17 in a direction orthogonal to the optical axis, and is connected to a flexible printed circuit board 21. Reference numeral 22 denotes a photo-interrupter for detecting the position of the filter holding frame 17 in the direction orthogonal to the optical axis, which is mounted on the flexible printed circuit board 21. The gear cover 25 holds the actuator 20 and rotatably holds the intermediate gear unit 24 between the gear cover 25 and the fixed lens barrel 12.

Figure 6:
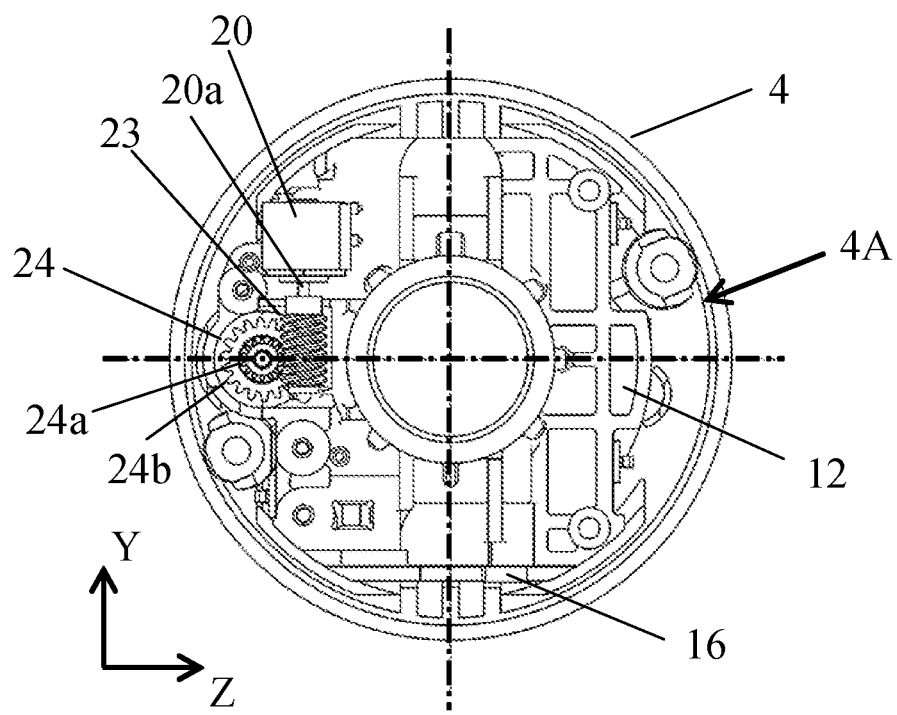
FIG. 6 is a front view of the camera unit according to this embodiment excluding a front holder and a gear cover.

The driver includes an actuator 20, a worm (cylindrical worm) 23 fixed onto a rotation shaft 20a (FIG. 6 described later), and the intermediate gear unit 24. The intermediate gear unit 24 has a worm wheel (bevel gear) 24a and a pinion (spur gear) 24b, which have a coaxial rotation shaft 24c (FIG. 6). Due to the coaxial structure, the image pickup apparatus can be made compact. The worm 23 is a screw-shaped gear with a small number of teeth, which is rotated integrally with the rotation shaft 20a by the rotor of the actuator 20. The worm wheel 24a is engaged with the worm 23 and forms a worm gear with the worm 23. The pinion 24b is integrated with the worm wheel 24a, and rotates as the worm wheel 24a rotates. The pinion 24b is engaged with a rack 17a formed on the filter holding frame 17.

Due to the above configuration, the driving force of the actuator 20 is transmitted to the filter holding frame 17 via the worm 23, the intermediate gear unit 24, and the rack 17a. JP 2012-173523 uses a lever as a power transmission mechanism to drive the filter holding frame, but this embodiment uses the worm gear including the worm 23 and the worm wheel 24a as the power transmission mechanism. The worm gear can suppress the transmission of the rotation from the worm wheel side to the worm side by adjusting the advance (or fast) angle of the groove of the worm 23 (self-lock function). In other words, by setting the advance angle of the worm 23 to a predetermined value, it becomes possible to increase a load P necessary to rotate the worm 23 from the filter holding frame 17 side or to perform the self-lock. As a result, by setting the load P larger than the load in the filter inserting/removing direction applied to the filter holding frame 17 when the impact or vibration is applied, it is possible to prevent the filter from being unintentionally switched. Since the power transmission mechanism serves as the lock mechanism, the optical apparatus can be made smaller than that including a new lock unit.

Referring now to FIG. 4, a description will be given of the filter switching operation according to this embodiment. When a driving signal is input to the actuator 20 via unillustrated electric wiring connected to the image sensor substrate 14, the rotor of the actuator 20 rotates around the rotation axis. As the rotor of the actuator 20 rotates, the worm 23 fixed to the rotating shaft 20a and the worm wheel 24a (the intermediate gear unit 24) engaged with it rotate. When the intermediate gear unit 24 rotates, the filter holding frame 17 moves in the direction orthogonal to the optical axis via the pinion 24b and the rack 17a engaged with the pinion 24b. The driving signal is input into the actuator 20 so as to stop when the filter holding frame 17 moves by a predetermined movement amount.

FIG. 2B illustrates that the infrared cutting filter 18 is inserted into the optical path (optical axis OA), and FIG. 4 illustrates that the dummy glass 19 is inserted into the optical path. The infrared cutting filter 18 and the dummy glass 19 are selectively inserted into the optical path by driving the filter holding frame 17 in the direction orthogonal to the optical axis indicated by an arrow in FIG. 5.

Figure 5:
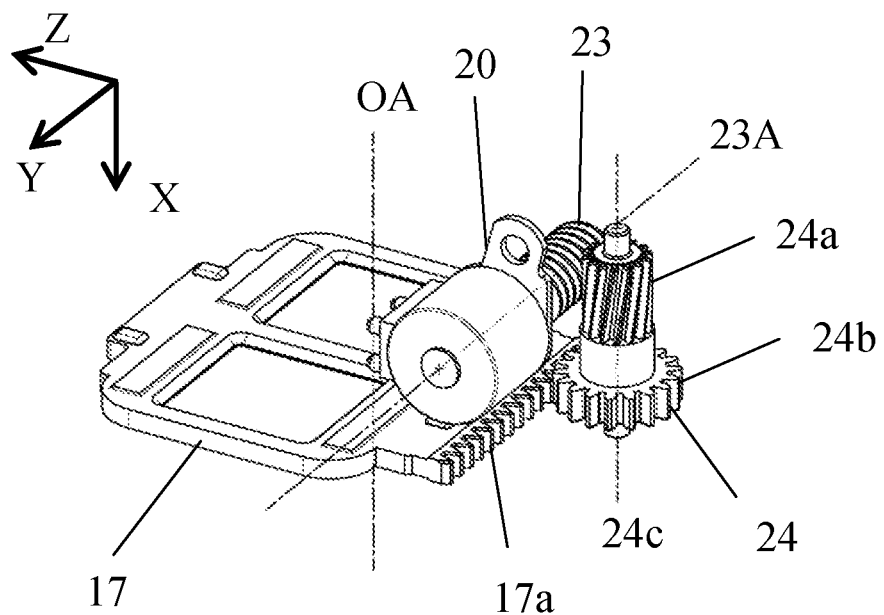
FIG. 5 is a perspective view illustrating an arrangement of a filter holding frame, a worm gear, and a worm wheel according to this embodiment.

Referring now to FIG. 5, a description will be given of an arrangement of the filter holding frame 17, the worm 23, and the intermediate gear unit 24. FIG. 5 is a perspective view showing the arrangement of the filter holding frame 17, the worm 23, and the intermediate gear unit 24.

A direction of a rotation axis 23A of the worm 23 fixed onto the actuator 20 is the same as (parallel to) the Y-axis direction which is the driving direction of the filter holding frame 17. Thereby, the image pickup apparatus 1 can be made compact. A rotation shaft 24c of the intermediate gear unit 24 is approximately the same direction as the optical axis direction (X-axis direction). The intermediate gear unit 24 is located farther from the optical axis OA than the rack 17a, and the rotation shaft 23A is located closer to the optical axis OA than the rotation shaft 24A. Due to this arrangement, the filter holding frame 17 and its driver can be housed in a small range viewed from the optical axis direction, and the camera unit 2 and thus the image pickup apparatus 1 can be reduced in size.

FIG. 6 is a front view of the camera unit 2 excluding the front holder 3 and the gear cover 25 viewed from the object side in the optical axis direction. Since the camera unit 2 according to this embodiment has the above compact configuration, as illustrated in FIG. 6, the gear unit 24, the actuator 20, and the worm 23 are housed in an inner circumference circle 4A of the rear holder 4 determined by the length of the filter base 16 in the Y-axis direction. Thus, the filter can be stably held with a small configuration even when the vibration or impact is applied.

This embodiment disposes the rotation shaft 23A of the downsized worm 23 between the optical axis OA and the rotation shaft 24A of the intermediate gear unit 24, but the present invention is not limited to this embodiment. For example, if the camera unit 2 does not have an approximately spherical shape or the like and the camera unit 2 may partially protrude, the rotation axis 24A of the intermediate gear unit 24 may be disposed between the optical axis OA and the rotation axis 23A of the worm 23.

As described above, this embodiment can provide a compact optical apparatus that can prevent the filter switching mechanism for inserting and removing the filter into and from the optical path from unintentionally switching the filter when the impact or vibration is applied. The optical apparatus according to the present invention includes a lens apparatus such as an interchangeable lens apparatus, an image pickup apparatus such as a surveillance camera and a digital camera, and other optical apparatuses such as an extender. In addition, the optical element is not particularly limited, and may include an optical filter that transmits light of a specific wavelength, various glasses, lenses, and the like. In the worm gear, the worm and the bevel gear (worm wheel) may be in point or line contact. The worm may be a cylindrical worm or a drum-shaped worm. The moving direction of the optical element is not limited, and may include components in the optical axis direction and another direction.

The present invention is not limited to the configuration illustrated in FIG. 5. In FIG. 5, the worm wheel 24a is provided on the right side (in the −Z axis direction) of the worm 23, but may be provided below the worm 23 (in the X-axis direction). In this case, the intermediate gear unit 24 is rotated by 90° to the left in FIG. 5. In this case, the rack 17a faces the side (in the −X axis direction) of the filter holding frame 17 opposite to the actuator 20. As described above, in FIG. 5, the optical axis OA and the rotation axis 24c of the pinion 24b are parallel to each other, and when viewed from the optical axis direction, the rotation axis 23A of the worm 23 is disposed between them. On the other hand, in the above modification, the rotation axis 24c of the pinion 24b is orthogonal to the optical axis OA and the rotation axis 23A of the worm 23, and the rotation axis 23A of the worm 23 is located between the optical axis OA and the center of the pinion 24b (the center in the Z-axis direction and the Y-axis direction).

As described above, the optical apparatus (image pickup apparatus 1, camera unit 2, and lens barrel unit 5) according to this embodiment holds the optical element (infrared cutting filter 18) and includes the filter holding frame 17 having the rack 17a, and the driver for driving the holding frame. The driver includes the worm 23 rotated by the actuator 20, the worm wheel 24a that forms the worm gear together with the worm 23, and the pinion 24c that rotates with the rotation of the worm wheel 24a and is engaged with the rack 17a. The optical apparatus according to this embodiment can stably hold (lock) the optical element at the predetermined position even when there is an impact etc. by using the self-locking function of the worm gear, thereby preventing the optical element from unintentionally moving.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-098375, filed on May 27, 2019, 2019-090883, filed on May 13, 2019, 2019-074542, filed on Apr. 10, 2019, and 2019-163542, filed on Sep. 9, 2019, each of which is hereby incorporated by reference herein in their entirety.

What is claimed is:

1. An optical apparatus comprising:
    an optical system;
    a holding frame configured to hold an optical element and including a rack; and
    a driving portion that is able to drive the holding frame such that the optical element moves between a position on an optical axis of the optical system and a position retracted from the optical axis,
    wherein the driving portion includes:
        a worm rotated by an actuator;
        a worm wheel configured to engage with the worm; and
        a pinion configured to be integrally formed with the worm wheel, to rotate with a rotation of the worm wheel, and to be engaged with the rack, and
    wherein a rotation axis of the worm is disposed between the optical axis and a center of the pinion when viewed from an optical axis direction.

2. The optical apparatus according to claim 1, wherein the driving portion includes a gear unit having the worm wheel and the pinion, and the worm wheel and the pinion have a coaxial rotation axis.

3. The optical apparatus according to claim 1, wherein a driving direction of the holding frame and a direction of the rotation axis of the worm gear are parallel to each other.

4. The optical apparatus according to claim 1, wherein a rotation axis of the pinion is parallel to the optical axis, and the rotation axis of the worm is disposed between the optical axis and the rotation axis of the pinion when viewed from the optical axis direction.

5. The optical apparatus according to claim 1, wherein a rotation axis of the pinion is orthogonal to the optical axis and the rotation axis of the worm.

6. The optical apparatus according to claim 1, further comprising a barrel having an opening through which the holding frame is inserted from a direction orthogonal to the optical axis, and configured to hold the holding frame and the optical system.

7. The optical apparatus according to claim 1, further comprising an image sensor configured to photoelectrically convert the optical image.

8. The optical apparatus according to claim 1, wherein the optical apparatus includes an approximately spherical shape.

* * * * *